(12) United States Patent
Yamanaka

(10) Patent No.: US 6,791,927 B2
(45) Date of Patent: Sep. 14, 2004

(54) OPTICAL HEAD HAVING OPTIMUM TILT ANGLES

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 210 days.

(21) Appl. No.: 10/167,416

(22) Filed: Jun. 13, 2002

(65) Prior Publication Data

US 2002/0191515 A1 Dec. 19, 2002

(30) Foreign Application Priority Data

Jun. 13, 2001 (JP) ........................................ 2001-178740

(51) Int. Cl.⁷ ................................................. G11B 7/00
(52) U.S. Cl. ............................... 369/53.19; 369/44.32; 369/44.23; 369/112.01
(58) Field of Search ........................... 369/44.12, 44.23, 369/44.25, 44.27, 44.28, 44.32, 44.41, 53.1, 53.12, 53.19, 112.01, 112.02, 112.1, 112.27

(56) References Cited

U.S. PATENT DOCUMENTS 6,246,648 B1 * 6/2001 Kuribayashi ............. 369/44.32
6,282,161 B1 * 8/2001 Son et al. ................. 369/53.19

* cited by examiner

*Primary Examiner*—Muhammad Edun
(74) *Attorney, Agent, or Firm*—Young & Thompson

(57) ABSTRACT

An optical head has an initial setting for a tilt angle of an objective lens with respect to an optical disk. If a different optical disk having a different transparent layer is used for recording/reproducing data thereon, the lens actuator changes the tilt angle of the objective lens to an optimum tilt angle with respect to the different optical disk, or a optical correction device optically compensates the wave front aberration.

20 Claims, 7 Drawing Sheets

OPTICAL HEAD HAVING OPTIMUM TILT ANGLES

BACKGROUND OF THE INVENTION (a) Field of the Invention

The present invention relates to an optical head having optimum tilt angles and, more particularly, to an optical head having optimum tilt angles of the objective lens with respect to different types of optical disk such as CD and DVD.

(b) Description of the Related Art

Along with the development of optical disks, a multiple of types of optical disks are manufactured and used in these days. In view of this fact, the request has increased that a single optical head can record/reproduce data on the multiple types of the optical disks.

Recording/reproducing of data on the typical optical disk is generally performed by accessing a data storage layer of the optical disk through a transparent substrate or transparent layer, which is transparent to the wavelength used and mounts thereon the data storage layer. In order to increase the storage capacity of the optical disk for meeting the request from the market, the data storage layer is improving its performance in the recording density. This generally leads to a smaller-thickness data storage layer in the new type of optical disks for which a new specification is created, in order to allow a minute optical spot to be formed on the data storage layer.

A typical example of the smaller-thickness data storage layer recently achieved is shown by the fact that the conventional compact disk (CD) includes a transparent substrate having a thickness of 1.2 mm, whereas the new digital versatile disk (DVD) includes a transparent substrate having a thickness of 0.6 mm. In this context, the CD has a storage capacity of about 640 MB whereas the DVD has an improved storage capacity of about 4.7 GB.

It is difficult for a conventional objective lens to adapt to different types of optical disks, by forming a focused optical spot having a diameter on the order of diffraction limit thereof, due to the optical disks including transparent layers having different thicknesses.

In view of the above, extensive studies have been conducted to develop a new structure of the objective lens, such as an objective lens having thereon a diffraction grating or having a non-spherical surface. These studies have achieved an objective lens which is capable of forming suitable focused spots on both the optical disks having different thicknesses in the transparent substrates.

There is a remaining problem, however, in the objective lenses thus achieved that it is difficult to manufacture a plurality of objective lenses having an accurate design structure due to the complicated structure thereof which reduces the tolerance in the structure during the manufacturing process.

In particular, the tolerance includes one related to the optimum tilt angle of the objective lens with respect to the optical disk, wherein the optimum tilt angle differs between the different types of the optical disk.

FIG. 1 shows such a problem by illustrating jitter characteristics of an objective lens, wherein the jitter in the reproduced signal is plotted against the tilt angle of the objective lens with respect to the optical disk. In FIG. 1, graph (a) shows the jitter characteristic curve for a first optical disk including a transparent layer having a larger thickness, whereas graph (b) shows the jitter characteristic curve for a second optical disk including a transparent layer having a smaller thickness. As understood from FIG. 1, the optimum tilt angle of the objective lens which achieves minimum of the jitter differs between the different types of the optical disks.

In the conventional technique, the tilt angle is set at an initial angle setting which balances both the characteristic curves. This lowers the tolerance of the optical head related to warp of the optical disk compared to the case wherein the optimum tilt angle is set between the optical disk and the objective lens for the specific optical disk, thereby increasing the wave front aberration.

SUMMARY OF THE INVENTION

In view of the above, it is an object of the present invention to provide an optical head which is capable of suppressing generation of the wave front aberration with respect to a plurality of types of the optical disks.

The present invention provides an optical head including: a light source for emitting light having a first wavelength; an objective lens for irradiating the light from the light source onto a data storage layer through a transparent layer in a first optical disk; a lens actuator for mounting the objective lens at an initial tilt angle setting; and a control unit including a calculation section for calculating an offset angle between the initial tilt angle setting and an optimum tilt angle of the objective lens with respect to the first optical disk, and a correction section for correcting, based on the offset angle, a wave front aberration of the light before passing the objective lens.

In accordance with the optical head of the present invention, a plurality of types of the optical disks can be accessed by the optical head with the optimum tilt angles of the objective lens with respect to the optical disks, whereby the jitter characteristic of the optical head can be improved.

The above and other objects, features and advantages of the present invention will be more apparent from the following description, referring to the accompanying drawings.

PREFERRED EMBODIMENTS OF THE INVENTION

Figure 1:
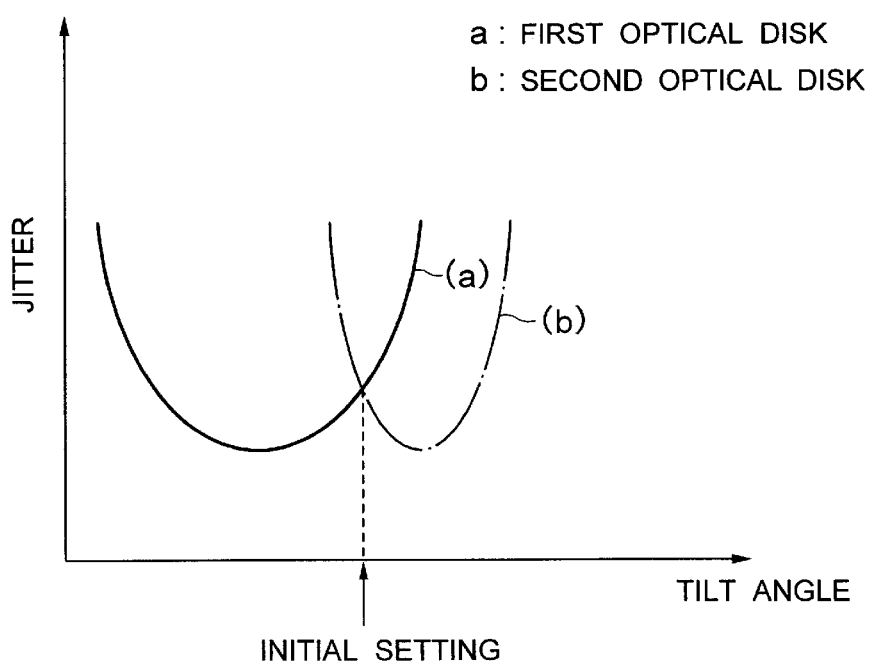
FIG. 1 shows jitter characteristic curves of optical head, illustrating the initial setting for the tilt angle of the objective lens with respect to the optical disk.

Now, the present invention is more specifically described with reference to accompanying drawings, wherein similar constituent elements are designated by similar reference numerals.

Figure 2A:
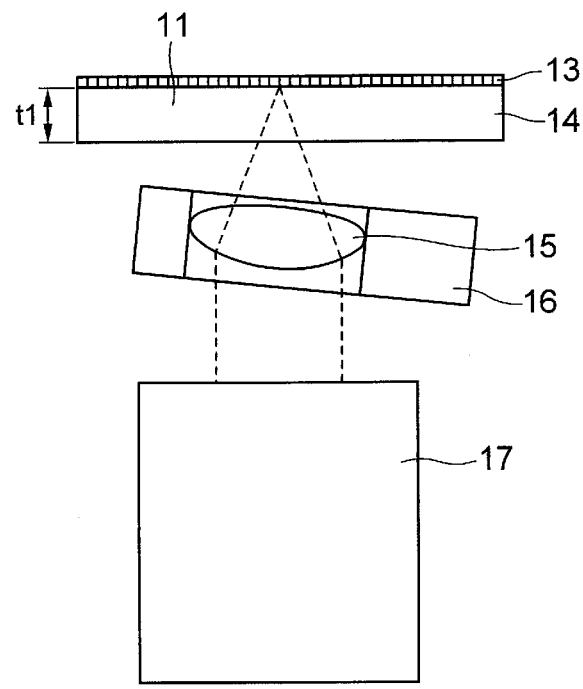
FIGS. 2A and 2B are schematic side views of an optical head, according to a first embodiment of the present invention, each in combination with an optical disk.
Figure 2B:
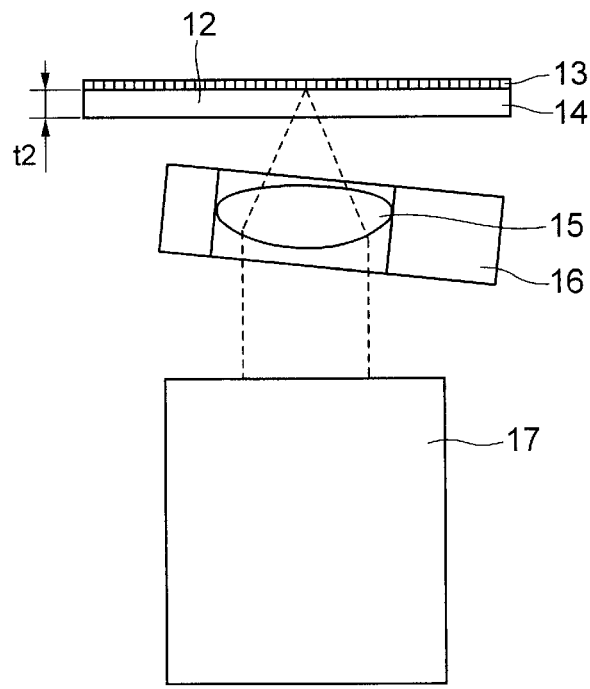

Referring to FIGS. 2A and 2B, an optical head according to a first embodiment of the present invention is shown to access first and second optical disks having different transparent substrates having different thicknesses. The first optical disk 11 shown in FIG. 2A includes a transparent layer 14 having a larger thickness of t1 and a data storage layer 13 formed thereon, whereas the second optical disk 12 shown in FIG. 2B includes a transparent layer 14 having a smaller thickness of t2 and a data storage layer 13 formed thereon.

The optical head of the present embodiment includes an objective lens 15 mounted on a lens actuator 16, and an optical system 17 having therein a light source and passing the light from the light source toward the objective lens 15. Although the optical head additionally has an electric circuit including a tracking servo control unit etc., the description of these elements is omitted herein for simplification purpose.

The optical system 17 includes a laser device, a photodetector, beam splitter etc., which are known in this art, and detects a plurality of signals including a tracking error signal for tracking the optical head on the optical disk. A plurality of laser devices may be provided therein having different wavelengths.

The objective lens 15 is associated with an adjustment unit which adjusts the location of the objective lens in the focusing direction and the track-crossing direction, in order to cancel the deviations of the optical disk in the direction normal to the disk surface and the direction normal to the track. The lens actuator 16 mounting thereon the objective lens 15 has a tilt-angle adjusting function for adjusting the tilt angle of the objective lens 15 with respect the optical disk 11 or 12. The tilt-angle adjusting function is implemented by an electromagnetic force which changes the tilt angle of the lens 15 similarly to the focusing and tracking controls.

Figure 3:
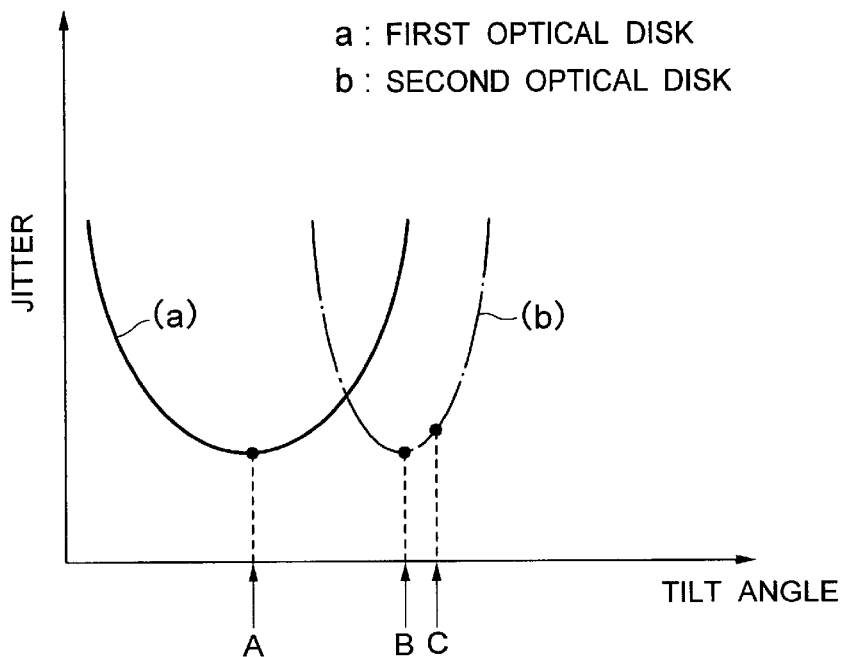
FIG. 3 shows jitter characteristic curves of the optical head of the first embodiment, illustrating the settings for the tilt angle of the objective lens with respect to the optical disk.

FIG. 3 shows the jitter characteristics of the objective lens 15, wherein the jitter in the reproduced signal is plotted on ordinate against the tilt angle between of the objective lens 15 with respect to the optical disk 11 or 12. The graph (a) shows the jitter characteristic of the optical head with respect to the first optical disk 11 having a thick transparent layer, whereas the graph (b) shows the jitter characteristic of the optical head with respect to the second optical disk 12 having a thin transparent layer. Due to the smaller storage capacity of the first optical disk 11 having the thick transparent layer, the jitter characteristic for the first optical disk 11 has a moderate change rate as compared to the jitter characteristic of the second optical disk 12.

The initial angle setting of the lens actuator 16 is such that the objective lens 15 has an optimum tilt angle with respect to the first optical disk 11 used as a reference disk. In FIG. 3, the initial angle setting is indicated by angle "A". As understood from FIG. 3, this initial angle setting "A" deviates from the optimum tilt angle "B" of the objective lens 15 with respect the second optical disk 12. Thus, the optimum tilt angle "B" for the second optical disk 12 can be obtained by shifting the tilt angle of the objective lens 15 from the initial angle setting "A" to the optimum tilt angle "B". This is achieved by using the tilt-angle adjusting function of the lens actuator 16 which inclines the objective lens 15 by an angle equal to the offset amount "B-A" between the optimum tilt angle "B" and the initial angle setting "A". FIG. 2B shows the optical head in this state of the optimum tilt angle "B" obtained by the lens actuator 16.

In the tilt-angle adjustment by the lens actuator 16 as described above, the offset angle "B-A" is used for achieving the optimum tilt angle of the objective lens 15 with respect to the second optical disk 12, the offset angle being obtained as a difference between the two optimum tilt angles "A" and "B". In an alternative, for a higher accuracy of the tilt angle, the current tilt angle of the objective lens 15 with respect to the second optical disk 12 may be detected by a known tilt-angle detector provided in the optical system 17, and the tilt angle is adjusted from the offset angle based on the detected angle. This is employed because the second optical disk 12 having a higher storage density inherently has a smaller tolerance of the tilt angle in the jitter characteristic, and because the optimum tilt angle thus determined is in fact difficult to maintain during the recording/reproducing operation due to the fluctuation of the tilt characteristic in the lens actuator 16 or presence of the warp of the second optical disk 12.

The tilt-angle detector as described above may be a dedicated tilt-angle detector, wherein a pair of photodetectors receive the light emitted from a LED (light emitting diode) and detect the tilt angle by the balance or unbalance between the detected amounts of light. The tilt-angle detector may be such that the tracking error detection system calculates the tilt angle, or such that the tilt angle is detected from the jitter in the detected signal while changing the tilt angle.

The tilt-angle adjusting function of the lens actuator may 16 be such that adjusts the angle of the carriage which transfers the optical head in the radial direction as a whole including the base structure, such that adjusts the angle of the optical head as a whole, or such that adjusts the angle of the lens actuator 16 as a whole in the optical head.

In the adjustment of the tilt angle of the objective lens 15 while detecting the tilt angle thereof, the offset angle as a whole from the initial angle setting may be adjusted by the tilt-angle adjustment function. In an alternative, a specified offset angle corresponding to the characteristics of the objective lens may be added with a minor correction amount which is determined by the result of the detection of the tilt angle. This may be employed in the case of a larger offset angle caused by the characteristic of the objective lens. More specifically, as shown in FIG. 3, the offset angle "B-A" between the initial angle setting "A" and the optimum angle "B" is first adjusted, and then the minor offset angle "C-B" is added thereto based on the detected tilt angle. This provides an improvement in the adjustment of the tilt angle due to the smaller correction amount.

In the above example, the first optical disk 11 having the thick transparent layer is used as the reference disk for the initial angle setting of the objective lens 15. However, the second optical disk 12 having the thin transparent layer may also be used as the reference disk. If the allowable margin for the initial angle setting is relatively larger compared to the fluctuation factors such as the warp of the optical disk, the second optical disk 12 may be preferably used as the reference disk because it may be expected that the initial angle setting itself allows the suitable setting for the first optical head 11.

Figure 4:
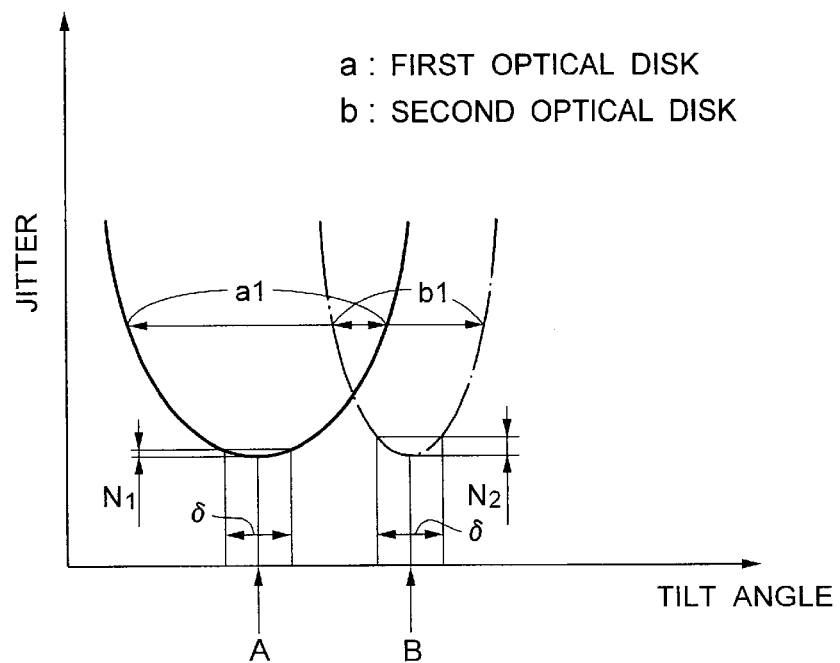
FIG. 4 shows jitter characteristic curves of the optical head of the first embodiment, illustrating the settings for the tilt angle of the objective lens with respect to the optical disk.

FIG. 4 shows allowable margins for the tilt angle with respect to a specified jitter in the case of the first and second optical disks 11 and 12, wherein the first optical disk 11 allows a larger margin a1 compared to the margin b1 allowable for the second optical disk 12. If the second optical disk 12 is used for the reference disk in the initial angle setting, it means that the initial angle setting is determined in a strict condition, although the setting itself can be performed without consideration of other factors.

The "strict condition" as used herein means that a higher accuracy is required for determining the initial angle setting. For example, in FIG. 4, if the initial angle setting is determined for the first optical disk 11 at angle "A", deviation from the initial angle setting "A" by an amount of δ during the setting operation only increases the jitter by N1. In contrast, if the initial angle setting is determined for the second optical disk at angle "B", deviation from the initial angle setting "B" by an amount of δ during the setting operation increases the jitter by as large as N2.

By setting the initial angle in a strict condition for the second optical disk 12 without consideration of other factors, substantially optimum tilt angle may be obtained for the first optical disk 11 by using the correction by the offset angle "B-A" due to the larger margin for the tilt angle with respect to the first optical disk 11. Thus, practically suitable characteristics can be achieved for the optical head.

The correction of the tilt angle by using the offset angle in this embodiment mechanically corrects or compensates the wave front aberration of the light to be caused by the objective lens, as in the cases of the second and third embodiments.

Figure 5:
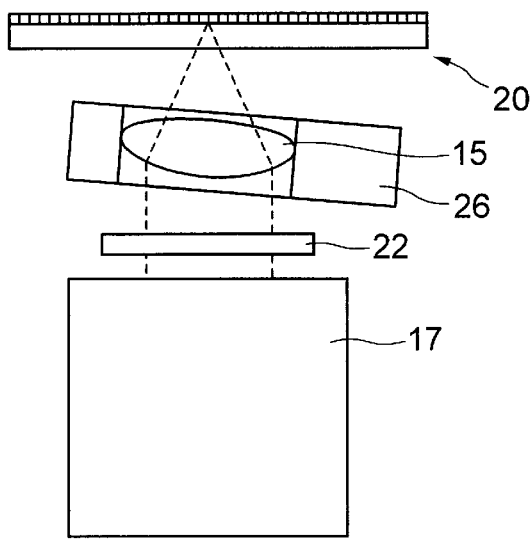
FIG. 5 is a side view of an optical head according to a second embodiment of the present invention in combination with an optical disk.

Referring to FIG. 5, an optical head according to a second embodiment of the present invention uses a wave front correction unit 22 instead of the adjustment of the tilt angle itself, the wave front correction unit optically compensates the offset angle.

More specifically, the optical head includes the wave front correction unit 22 interposed between the objective lens 15 and the optical system 17. The wave front correction unit 22 has a function for dynamically controlling the wave front of the passing light.

Figure 6A:
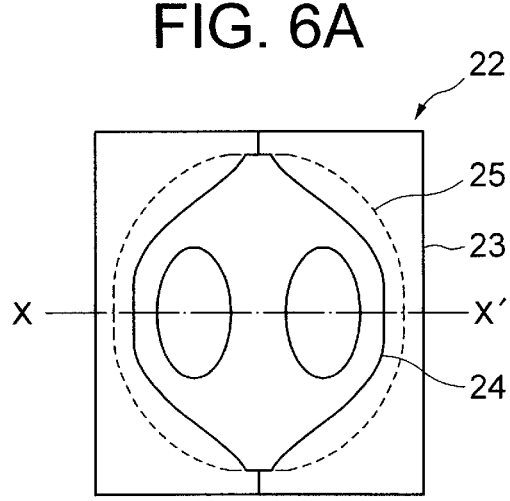
FIG. 6A is a top plan view of a wave front correction unit having an LC layer.

Referring to FIG. 6A, the wave front correction unit 22 includes a liquid crystal (LC) layer 23, to which a voltage profile is applied by an electrode 24 having specific patterns. The applied voltage profile generates a plurality of refractive index patterns on the LC layer 23. The refractive index patterns generated on the LC layer 23 provide phase patterns for the wave front in the passing light. In this embodiment, the electrode 24 has five regions, to which different voltages are applied while being controlled independently of each other.

Figure 6B:
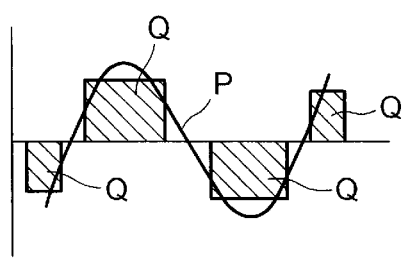
FIG. 6B is a graph showing the wave front aberration of the light on the wave front correction unit of FIG. 6A at the location along line X-X' in FIG. 6A.

Most of the wave front aberration caused by the offset of the tilt angle of the objective lens is the comatic aberration, the profile of which is shown by curve "P" in FIG. 6B as such taken along line X-X' in FIG. 6A. Cancellation of the comatic aberration such as shown in FIG. 6B by using the phase difference in the LC layer 23 achieves an effect similar to that obtained in the first embodiment wherein the optimum tilt angle is obtained by tilting the objective lens.

In a practical view point, the wave front aberration need not be completely cancelled, and it is practically sufficient that the wave front aberration be partially compensated or suppressed down to a specific level. Thus, the curve "P" in FIG. 6B may be approximated by the hatched rectangular areas "Q" which are achieved by the LC layer 23. The amounts of the correction shown by the rectangular areas "Q" can be adjusted by dynamically changing the voltages applied to the electrode patterns. The configuration of the present embodiment has an advantage that the correction unit 22 includes only stationary elements. In the present embodiment, the electrode 24 should have finer patterns for meeting a larger amount for the correction of the tilt angle.

Figure 7:
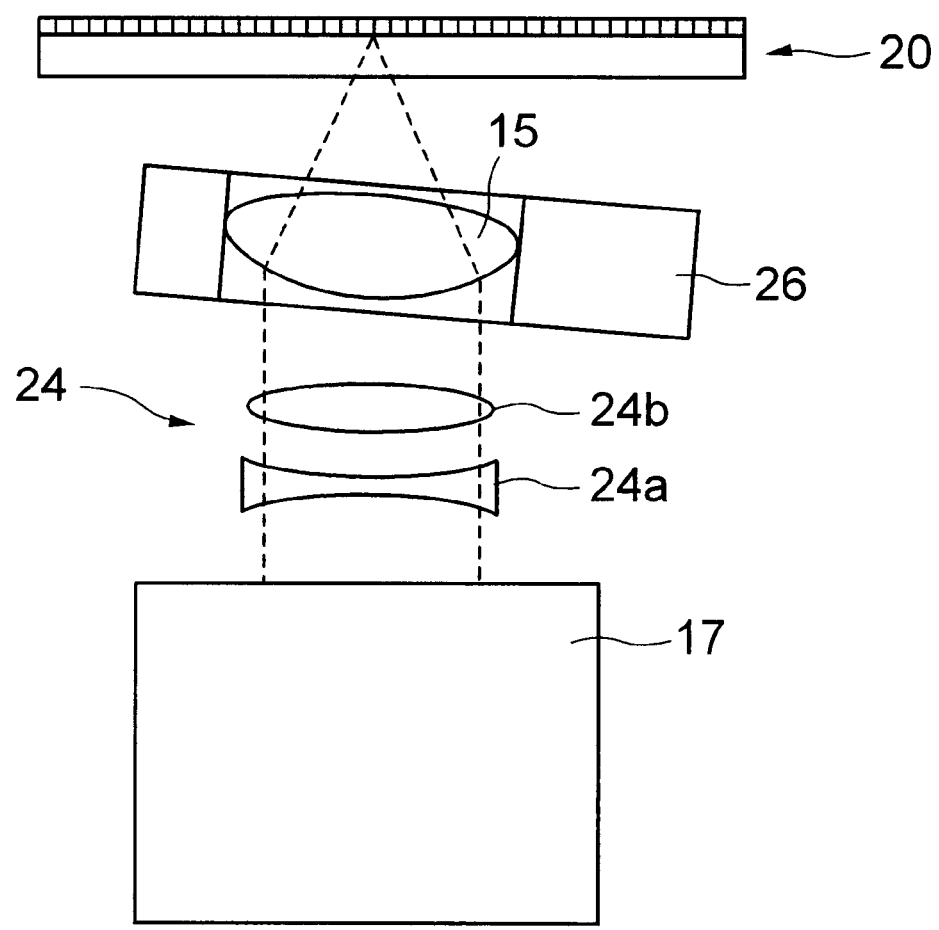
FIG. 7 is a side view of the optical head having a wave front correction unit including convex and concave lenses.

As the wave front correction unit 22 having a function for dynamically controlling the wave front, a combination lens 24 may be used, such as shown in FIG. 7. The combination lens 24 includes a concave lens 24a and a convex lens 24b, which are interposed between the optical system 17 and the objective lens 15, or disposed within the optical path in the optical head. By shifting the locations of the concave lens 24a and the convex lens 24b in the opposite directions, both of which are normal to the optical path, a wave front aberration correction can be obtained corresponding to the amounts of the shift of the lenses 24a and 24b. This is based on the fact that the aberration obtained by the combination lens 24 has a wave front shape roughly equal to the wave front shape of the comatic aberration.

It is to be noted that since the objective lens 15 is of a rotational symmetry, the direction of the deviation in the optimum tilt angle caused by the different types of the optical disks is arbitrary in the lens surface.

In the typical optical disk, data are recorded along the spiral track on the disk. The typical optical disk generally has a larger amount of warp in the radial direction than in the circumferential direction due to the structure of the disk. More specifically, the typical optical disk has a larger amount of warp in the direction normal to the track than in the direction of the track. Thus, most of the conventional correction units correct the tilt angle of the objective lens 15 only in the direction normal to the track.

Although the direction of the correction for the optimum tilt angle is not specifically recited in the above embodiments, the tilt-angle correction function of the typical optical head used heretofore may be used in the embodiments for correcting the tilt angle only in the direction normal to the track. This provides a practically suitable correction for the optimum tilt angle, because the deviation from the optimum tilt angle in the direction of the track causes only a fixed strain in the reproduced signal and such a strain can be corrected by using a waveform correction circuit which electrically corrects the strain.

However, if it is desired that all the offset of the tilt angle be corrected for assuring a device margin, the objective lens should be fixed onto the lens actuator so that the deviation of the tilt angle resides in the direction normal to the track after evaluating the direction of the deviation of the tilt angle of the objective lens.

In the above embodiments, the optimum tilt angles are determined for two different types of the optical disks having different thicknesses in the transparent layers. If the optimum tilt angles should be obtained for three or more types of the optical disks, the initial tilt angle should be determined based on the optical disk having a thickest transparent layer or the optical disk having a thinnest transparent layer as the referent disk.

Figure 8:
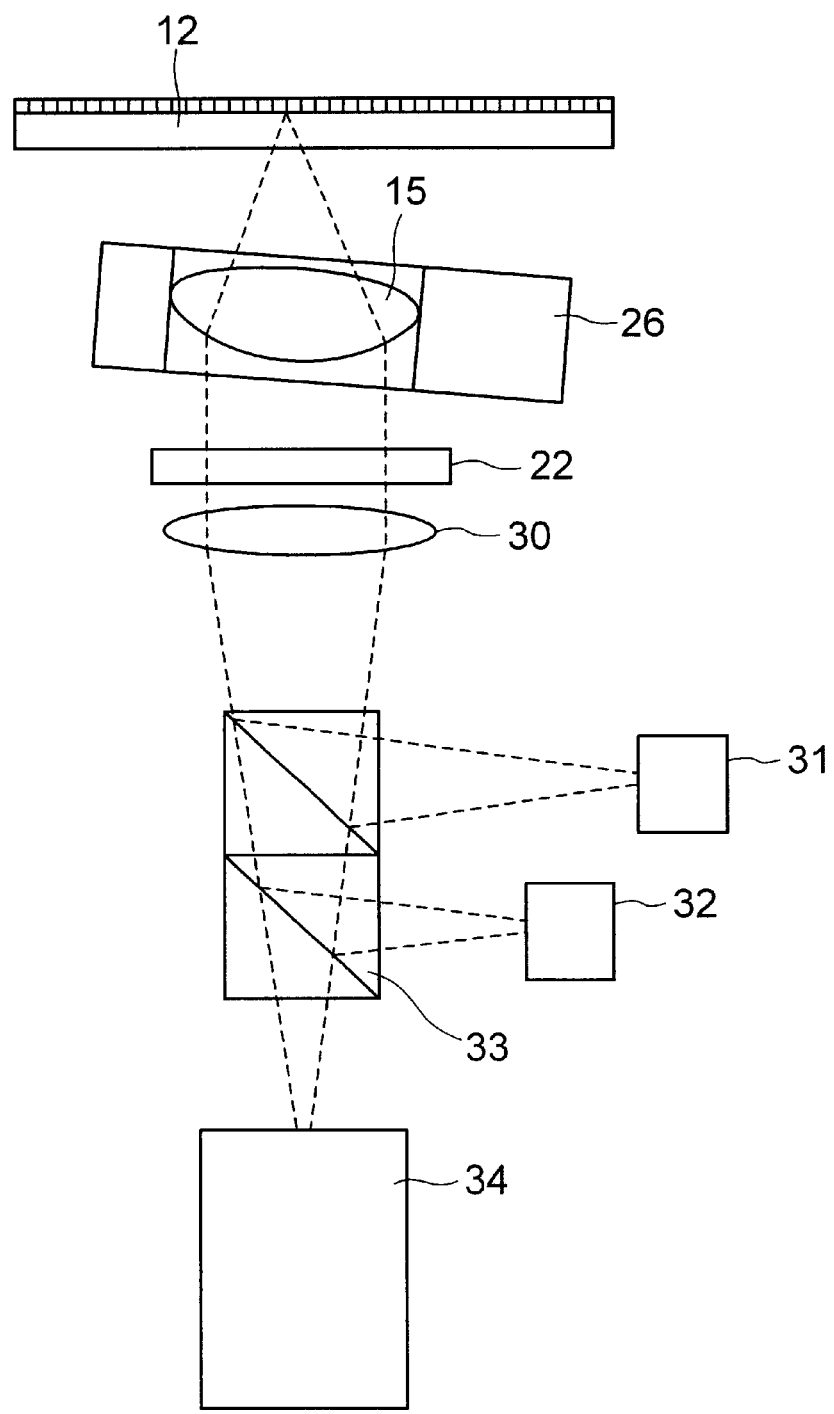
FIG. 8 is a side view of an optical head according to a third embodiment of the present invention in combination with an optical disk.

Referring to FIG. 8, an optical head according to a third embodiment of the present invention has first and second light sources corresponding to respective types of the optical disks, a collimate lens 30, and a wave front correction unit 22 interposed between the collimate lens 30 and the objective lens 15.

The optical paths of the lights irradiated from the first and second light sources 31 and 32 are merged into a single light by the function of a merging/separating prism 33. The merged light is passed by the collimate lens 30, the wave front correction unit 22, and the objective lens 15 on the lens actuator 26, to be focused on the optical disk 20. The light reflected by the optical disk 20 is passed by the lenses etc. in the opposite direction, to be introduced into the optical signal detection unit 34, wherein a tracking error signal, data signal etc. are detected from the reflected light.

The wave front correction unit 22 is a fixed optical device having a fixed correction amount and a wavelength selectivity. It is to be noted that the wave front correction unit 22 may be disposed at another location so long as the wave front correction unit 22 is disposed within the optical path of the merged light.

If the objective lens 15 is subjected to initial angle setting for the optimum tilt angle with respect to the first optical disk 11, which includes a thick transparent layer having a thickness of t1 and is to be accessed by the light from the first light source 31, it means that the objective lens 15 has a tilt angle deviated from the optimum tilt angle with respect to the second optical disk 12, which includes a thin transparent layer having a thickness of t2 (T2<t1) and is to be accessed by the light from the second light source 32. In this case, the wave front correction unit 22 generates a phase difference for correcting the wave front aberration with respect to the light from the second light source 32 due to the wavelength selectivity thereof. The wave front correction unit 22 does not generate such a phase difference with respect to the light from the first light source 31 due to the wavelength selectivity thereof.

Conversely, if the objective lens is subjected to the initial angle setting for the optimum tilt angle with respect the second optical disk 12, the selectivity of the wave front correction unit 22 is designed so that the wave front correction unit 22 generates a phase difference with respect to the light from the first light source 31 and no phase difference with respect to the light from the second light source 32.

Thus, the wave front correction unit 22 allows the optical head to access both the optical disks 11 and 12 at the substantially optimum tilt angles with respect to both the optical disks. The wave front correction unit 22 implemented as a fixed optical device has a lower characteristic fluctuation and thus provides an accurate correction with a smaller error.

Figure 9A:
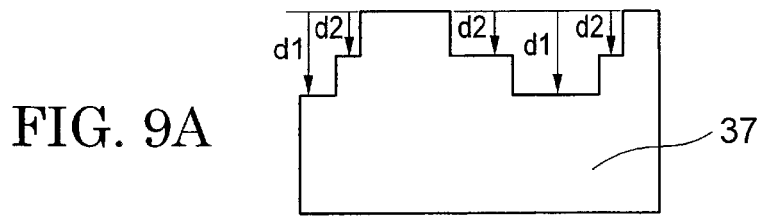
FIGS. 9A and 9B are top plan view and sectional view of a wave front correction unit implemented as a fixed optical device.
Figure 9B:
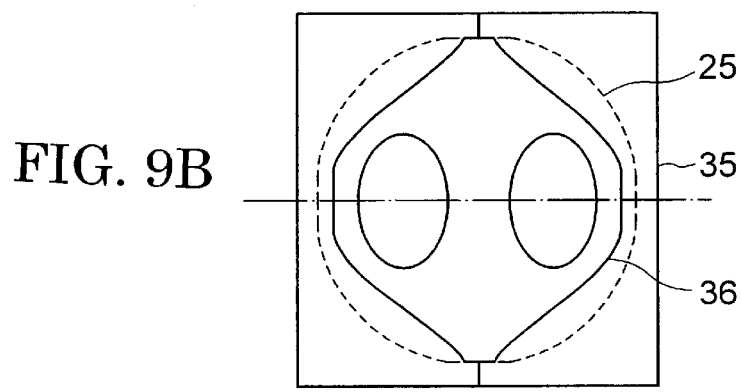

Referring to FIGS. 9A and 9B, the wave front correction unit 22 is implemented as a fixed optical device, which is formed as an optically transparent plate 35 having a plurality of step patterns 36. The step patterns 36 approximately correct the comatic aberration similarly to the case of the LC layer 23 in the second embodiment. The principle of the wavelength selectivity in the wave front correction unit 22 will be described below.

Assuming that the refractive index "n" of the transparent plate 35 is constant for the wavelengths $\lambda_1$ and $\lambda_2$ of the lights from the first and second sources 31 and 32, and that the depth of the step pattern is "d" (which assumes d1 and d2 for respective patterns), the phase difference "c1" and "c2" for the respective lights generated by the step pattern is expressed by:

$2\pi(n-1)d/\lambda_1 = c1$; and $2\pi(n-1)d/\lambda_2 = c2$.

If the depth "d" is designed to provide $c1 = 2 m \pi$, the wave front correction unit 22 dose not provide a phase difference at the step pattern wit respect to the light having the wavelength of $\lambda_1$. In this case, the following relationship holds:

$c2 = 2m\pi\lambda_1/\lambda_2$.

If the wavelengths are such that $\lambda_1 = 0.78$ μm and $\lambda_2 = 0.65$ μm, then the wave front correction unit 22 provides a phase difference of 0.4 π for m=1 and a phase difference of 0.8 π for m=2, with respect to the light having a wavelength of $\lambda_2$ due to the wavelength selectivity thereof. Although there are only discrete phase differences, the wave front correction unit of FIGS. 9A and 9B achieves suitable phase differences, thereby correcting the comatic aberration by the function of the step patterns.

If the wave front correction unit 22 has a wavelength selectivity which cannot provide a suitable wave front correction amount due to the discrete phase differences thereof, another wave front correction unit having step patterns may used in the optical path of the second light source (or the first light source), not in the merged optical path. It is to be noted that the another wave front correction unit should have more accuracy in the structure and the tilt angle correction function compared to the case disposed in the merged optical path, because the optical beam has a smaller diameter at the another wave front correction unit.

If the offset between the optimum tilt angles is roughly constant among a plurality of optical heads produced, a single type of wave front correction unit is sufficient. However, if the offset has significant variances within a range among the optical heads, a plurality of types of the wave front correction unit should be prepared beforehand and one of the types is used based on the needed correction amount. This affords suitable corrections to optical heads in practical use.

Figure 10:
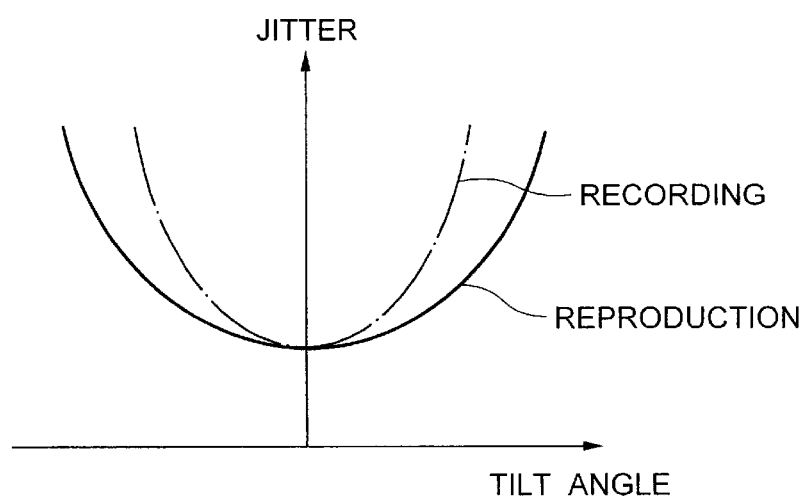
FIG. 10 shows jitter characteristic curves of an optical disk during recording/reproducing data on an optical disk.

There often occurs a case wherein one of the two optical disks is used for both recording and reproducing of data on the disk, and the other is dedicated to reproducing of data on the disk. In the optical disk used for recording and reproducing data, it is usual that the allowable margin for the tilt angle is narrower during the recording operation rather than during the reproducing operation, as shown in FIG. 10.

Thus, it is considered that the dedicated reproducing disk is used as the reference disk for the initial angle setting in the optical head. The optical head is then subjected to correction of offset with respect to the recording/reproducing optical disk by using a dynamic correction function of the optical head. In an alternative, the recording/reproducing optical disk is used as the reference disk, and the optical head is subjected to correction of a fixed value with respect to the dedicated reproducing disk. This is achieved by the technique as described with reference to FIG. 3.

It is possible to evaluate the optimum tilt angles of the objective lens with respect to different types of the optical disks after the overall structure of the optical head is fabricated. However, in consideration that the jitter characteristic mostly depends on the objective lens itself, it is more preferable that the offset angle be evaluated in an evaluation optical system for the objective lens alone, or such mounted on a lens actuator for a handling purpose. In this case, the evaluated offset angle is used for determining the correction amount, thereby raising the product yield of the optical heads.

If it is known that the product optical heads have only smaller variances in a lot of the products, the evaluation may be achieved by sampling. It is to be noted that each of the above embodiments may be combined with another or others of the above embodiments.

Since the above embodiments are described only for examples, the present invention is not limited to the above embodiments and various modifications or alterations can be easily made therefrom by those skilled in the art without departing from the scope of the present invention.

What is claimed is:

1. An optical head comprising:
   a light source for emitting light having a first wavelength;
   an objective lens for irradiating the light from said light source onto a data storage layer through a transparent layer in a first optical disk;
   a lens actuator for mounting said objective lens at an initial tilt angle setting; and
   a control unit including a calculation section for calculating an offset angle between said initial tilt angle setting and an optimum tilt angle of said objective lens with respect to said first optical disk, and a correction section for a correcting, based on said offset angle, a wave front aberration of the light before passing said objective lens,
   said correction section comprising a fixed optical device with a transparent plate having step patterns.

2. The optical head according to claim 1, wherein said correction section optically corrects said wave front aberration.

3. The optical head according to claim 2, wherein said correction section includes an LC layer applied with voltage patterns.

4. The optical head according to claim 2, wherein said wave correction section has includes a fixed optical device having a fixed correction amount.

5. The optical head according to claim 4, wherein said fixed optical device is a transparent plate having step patterns.

6. The optical head according to claim 4, wherein said control unit includes a plurality of said fixed optical devices, and one of said fixed optical devices corrects said wave front aberration.

7. The optical head according to claim 1, further comprising another light source for emitting light having a second wavelength, wherein said correction section does not correct a wave front aberration of the light having said second wavelength.

8. An optical head comprising:
   a light source for emitting light having a first wavelength;
   an objective lens for irradiating the light from said light source onto a data storage layer through a transparent layer in a first optical disk;
   a lens actuator for mounting said objective lens at an initial tilt angle setting; and
   a control unit including a calculation section for calculating an offset angle between said initial tilt angle setting and an optimum tilt angle of said objective lens with respect to said first optical disk, and a correction section for a correcting, based on said offset angle, a wave front aberration of the light before passing said objective lens,
   wherein said initial tilt angle setting is set as an optimum tilt angle of said objective lens with respect to a second optical disk, said second optical disk including a transparent layer having a thickness larger than a thickness of said transparent layer of said first optical disk.

9. The optical head according to claim 8, wherein said correction section controls said lens actuator to change said tilt angle of said objective lens with respect to said first optical disk based on said offset angle from said initial tilt angle setting.

10. The optical head according to claim 8, wherein said correction section optically corrects said wave front aberration.

11. An optical head comprising:
    a light source for emitting light having a first wavelength;
    an objective lens for irradiating the light from said light source onto a data storage layer through a transparent layer in a first optical disk;
    a lens actuator for mounting said objective lens at an initial tilt angle setting; and
    a control unit including a calculation section for calculating an offset angle between said initial tilt angle setting and an optimum tilt angle of said objective lens with respect to said first optical disk, and a correction section for a correcting, based on said offset angle, a wave front aberration of the light before passing said objective lens,
    wherein said initial tilt angle setting is set as an optimum tilt angle of said objective lens with respect to a second optical disk, said second optical disk including a transparent layer having a thickness smaller than a thickness of said transparent layer of said first optical disk.

12. The optical head according to claim 11, wherein said correction section controls said lens actuator to change said tilt angle of said objective lens with respect to said first optical disk based on said offset angle from said initial tilt angle setting.

13. The optical head according to claim 11, wherein said correction section optically corrects said wave front aberration.

14. The optical head according to claim 11, wherein said control unit further includes a tilt angle detection section for detecting an optimum tilt angle of said objective lens with respect to said first optical disk, and an additional correction section for additionally corrects said wave front aberration based on said detected optimum tilt angle.

15. An optical head comprising:
    a light source for emitting light having a first wavelength;
    an objective lens for irradiating the light from said light source onto a data storage layer through a transparent layer in a first optical disk;
    a lens actuator for mounting said objective lens at an initial tilt angle setting; and
    a control unit including a calculation section for calculating an offset angle between said initial tilt angle setting and an optimum tilt angle of said objective lens with respect to said first optical disk, and a correction section for a correcting, based on said offset angle, a wave front aberration of the light before passing said objective lens,
    wherein said correction section controls said lens actuator to change said tilt angle of said objective lens with respect to said first optical disk based on said offset angle from said initial tilt angle setting, and
    wherein said initial tilt angle setting is set as an optimum tilt angle of said objective lens with respect to a second optical disk dedicated to reproducing data thereon, and said first optical disk is used for recording and reproducing data thereon.

16. The optical head according to claim 15, wherein said correction section optically corrects said wave front aberration.

17. An optical head comprising:
- a light source for emitting light having a first wavelength;
- an objective lens for irradiating the light from said light source onto a data storage layer through a transparent layer in a first optical disk;
- a lens actuator for mounting said objective lens at an initial tilt angle setting; and
- a control unit including a calculation section for calculating an offset angle between said initial tilt angle setting and an optimum tilt angle of said objective lens with respect to said first optical disk, and a correction section for a correcting, based on said offset angle, a wave front aberration of the light before passing said objective lens,
- wherein said initial tilt angle setting is set as an optimum tilt angle of said objective lens with respect to a second optical disk used for recording and reproducing data thereon, and said first optical disk is dedicated to reproducing data thereon.

18. The optical head according to claim 17, wherein said control unit further includes a tilt angle detection section for detecting an optimum tilt angle of said objective lens with respect to said first optical disk, and an additional correction section for additionally corrects said wave front aberration based on said detected optimum tilt angle.

19. The optical head according to claim 17, wherein said correction section optically corrects said wave front aberration.

20. The optical head according to claim 17, wherein said correction section controls said lens actuator to change said tilt angle of said objective lens with respect to said first optical disk based on said offset angle from said initial tilt angle setting.

* * * * *